United States Patent

Hentschel et al.

[11] 3,720,156
[45] March 13, 1973

[54] ELECTRIC EGG COOKER

[75] Inventors: Harry Hentschel, Munich; Otto Bjarsch, Traunreut, both of Germany

[73] Assignee: Siemens-Electrogerate GmbH, Berlin and Munich, Germany

[22] Filed: Jan. 25, 1971

[21] Appl. No.: 109,442

[30] Foreign Application Priority Data

Jan. 27, 1970 Germany ..................G 70 02 615.2
Feb. 3, 1970 Germany ..................G 70 03 539.1

[52] U.S. Cl. ..................99/332, 99/343, 99/344, 99/352, 99/440
[51] Int. Cl. .................................................A47j 29/02
[58] Field of Search........99/352, 345, 348, 349, 423, 99/440, 448, 450, 332, 355, 343, 344; 219/440, 441, 442

[56] References Cited

UNITED STATES PATENTS

| | | | |
|---|---|---|---|
| 1,175,442 | 3/1916 | Hanks | 99/440 |
| 1,346,283 | 7/1920 | Vierling et al. | 99/440 |
| 2,402,883 | 6/1946 | Gavalis | 99/440 |
| 2,518,566 | 8/1950 | Osterheld | 99/440 |
| 3,143,639 | 8/1964 | Wickenberg et al. | 99/440 X |
| 3,166,005 | 1/1965 | Jepson | 99/440 |
| 3,577,908 | 5/1971 | Burg | 99/440 X |
| 3,147,689 | 9/1964 | Sakamoto et al. | 99/355 X |
| 3,411,432 | 11/1968 | Willett | 99/355 |

Primary Examiner—Billy J. Wilhite
Assistant Examiner—Arthur O. Henderson
Attorney—Curt M. Avery, Arthur E. Wilfond, Herbert L. Lerner and Daniel J. Tick

[57] ABSTRACT

An electric egg cooker for cooking eggs has a chalice-shaped housing defining a cooking space in which the eggs are cooked.

8 Claims, 6 Drawing Figures

PATENTED MAR 13 1973

ELECTRIC EGG COOKER

Our invention relates to an electric egg cooker having a housing surrounding a cooking space. The housing has a removable cover.

The known egg cookers have carrying grips for lifting the cooker. These grips are necessary because of the shape of the apparatus since without these additional elements or grips moving the apparatus is very difficult especially during its operation or shortly thereafter.

It is an object of our invention to provide an egg cooker of simplified construction. More specifically, it is an object of our invention to provide an electric egg cooker that does not have the additional carrying grips and is nonetheless easy to transport.

It is another object of our invention to provide an electric egg cooker equipped with a conveniently located needle device for piercing the shells of the eggs to be cooked.

It is still another object of our invention to provide an electric egg cooker with which the quantity of water needed for cooking can be measured in dependence upon the number of eggs and the degree or hardness to which the latter are to be cooked.

According to a feature of the invention, the housing of the egg cooker is constructed so as to have a chalice-like shape. An egg cooker constructed in this manner is easily grasped at the stem portion of the housing and transported.

An especially simple assembly of the housing according to the invention is obtained if the housing is constructed in two parts, one of the parts being a base and the other part a dish-shaped enclosure mounted thereon. A water dish is placed in the dish-shaped enclosure. The water dish has an undersurface in which a ring-shaped groove is provided for receiving a tubular heater body.

The water dish and the dish-shaped enclosure define a hollow space in which are accommodated an electrical connection member, a timing member and a signal member.

According to a further feature of the invention, the water dish and both housing parts are mutually joined by a central anchor bolt, the anchor bolt being secured in the bottom of the water dish.

A carrier plate is secured by the anchor bolt in the hollow space defined by the water dish and the dish-shaped enclosure. The electrical connection, timing and signal members are all mounted on the carrier plate. It is practical to locate an electrical switch on the base portion of the housing.

It is known in cooking that the shell of an egg will often burst when cooking the latter in water or a steam bath; this can be prevented by piercing the shell of the raw egg so as to form a small hole. Often this preparatory step is omitted because no suitable tool therefor is at hand.

Accordingly, it is another feature of our invention to provide a suitable tool for piercing the egg shell. According to this feature of the invention, a pointed instrument is located on the housing of the egg cooker. The pointed instrument can either be rigidly affixed or removably mounted on the housing.

If the needle is arranged so as to extend outwardly from the housing, a protective cap is provided to prevent injury and is removable when the needle is used. On the other hand, if the needle is arranged on the housing so as to be removable therefrom, then the needle is advantageously provided with a suitable hand grip.

For receiving the needle, a suitable hollow extension defining a cavity is provided on the cover lid of the egg cooker. It is especially advantageous if this extension is dimensioned or adapted so as to be usable as a cover lid handle in which case the handle of the needle would serve to cover the cavity receiving the needle.

The egg carriers in the known egg cookers take the form of discs with openings therein for accommodating several eggs and are provided in the middle region of the carrier with a carrying arm which is provided with a handle at its free end. The openings for receiving the eggs are arranged about the carrying arm so that an intermediate space remains between the placed eggs. This arrangmeent causes the space in the region of the carrying arm to be inefficiently used.

This space could be used to accommodate additional eggs. Accordingly, a further feature of the invention provides that the egg carrier be equipped with a lifting arm in lieu of the centrally located carrier arm. The lift arm engages the rim portion of the egg carrier at mutually opposite locations on the rim of the carrier. It is advantageous to make this carrier lifting arm of a poor heat-conductive material having a small heat capacity, for example, of a heat-resistant synthetic material.

The lifting arm is advantageously secured to the egg carrier when the lift arm grips the rim of the egg carrier in a claw-like manner. Specifically, the ends of the lift arm can be provided with respective extensions which grip the carrier at the rim in a form-locking manner. The carrier can be provided with respective openings at opposite-lying locations on the rim thereof. Each of the end portions of the lifting arm can be provided with extensions having a notch. These notches of the end portions respectively engage the openings in a form-locking manner.

Thus, because of the lift arm feature of the invention, the centrally located carrier arm is rendered unnecessary and at its location an additional opening can be provided for an additional egg and the other openings for receiving other eggs can be arranged thereabout with appropriate spacing.

The egg carrier is preferably constructed to have non-circular openings for receiving the eggs. This enables the eggs to be held in the openings only at limited portions of the periphery of the openings. This construction of the egg carrier results in openings between the placed egg and the edge of the opening so as to define a passage for permitting steam to travel directly along the egg shell thereby improving the cooking action.

In known egg cookers, the cooking time is determined from the steaming time of the quantity of water placed in the cooker. As soon as the water placed in the cooker is heated so that it is fully steaming, a thermostat, as a consequence of the increasing temperature, causes the heating current to be switched off thereby discontinuing the application of heat.

With egg cookers of this type, the cover of the egg cooker is constructed as a measuring beaker having a measuring scale arranged on the inside wall thereof. The arrangement of the measuring scale has the disadvantage that the number of eggs to be cooked at a given time is not considered. In addition, the quantity of water is subject to failure if the cover lid is held tilted when the water to be placed in the cooker is measured.

The invention to provide the possibility to enable one to measure a quantity of water needed to cook the eggs in dependence upon the number of eggs to be cooked in a single cooking operation while at the same time selecting the degree to which the eggs are to be cooked, namely, whether they are to be cooked soft, medium or hard. In addition, the selection of the appropriate water quantity is made easier thereby substantially eliminating the possibility of making an inaccurate measurement of the water quantity.

Accordingly, it is still another feature of the invention to provide a plurality of curved bands arranged on the inner surface of the cover lid of the egg cooker thereby permitting the cover lid to be used as a measuring beaker. Each band corresponds to the quantity of water needed for a specific degree of cooking and a specific number of eggs. Thus, the bands permit one to obtain a precise measurement of the quantity of water needed for a particular number of eggs to be cooked as well as the degree to which they are cooked. The bands can be closed or broken at specific locations and can be, for example, molded or inscribed on the inner surface of the cover lid.

It is especially simple to obtain the precise quantity of water for a particular cooking operation if according to a further feature of the invention, the curved bands are arranged so as to be tangent at the edge of the cover lid. In this way, when the excess water is spilled from the cover lid, it is directly possible to determined the required water quantity when the water level reaches the index corresponding to a specific number of eggs for a specific degree of cooking.

The indexing means of the invention can be efficaciously arranged in groups or sets of curved bands in the cover lid of the egg cooker. Each of the sets corresponds to a different degree to which the eggs are cooked, for example, three sets could be provided corresponding to soft, medium and hard boiled eggs, respectively. The curved bands in each set correspond to the respectively different quantity of eggs which are to be cooked.

The invention will now be described with reference to the drawings wherein.

Figure 1:
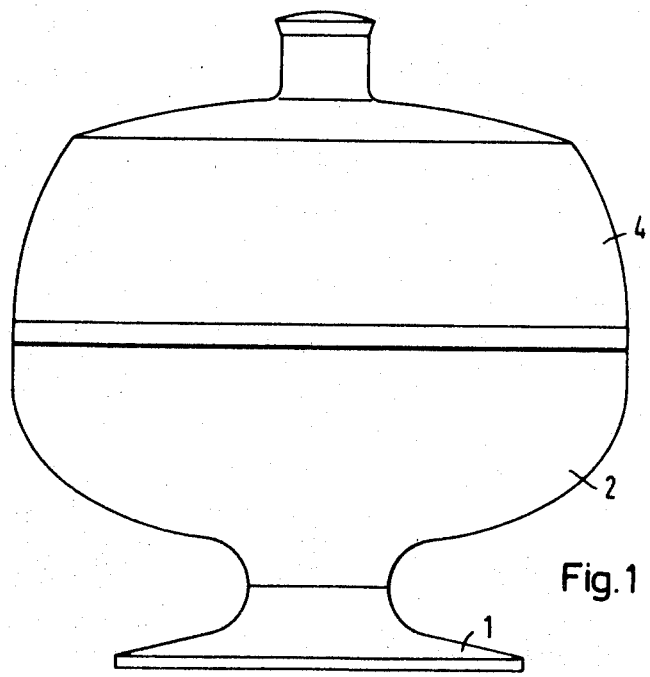
FIG. 1 is a side view of an electric egg cooker according to the invention.
Figure 2:
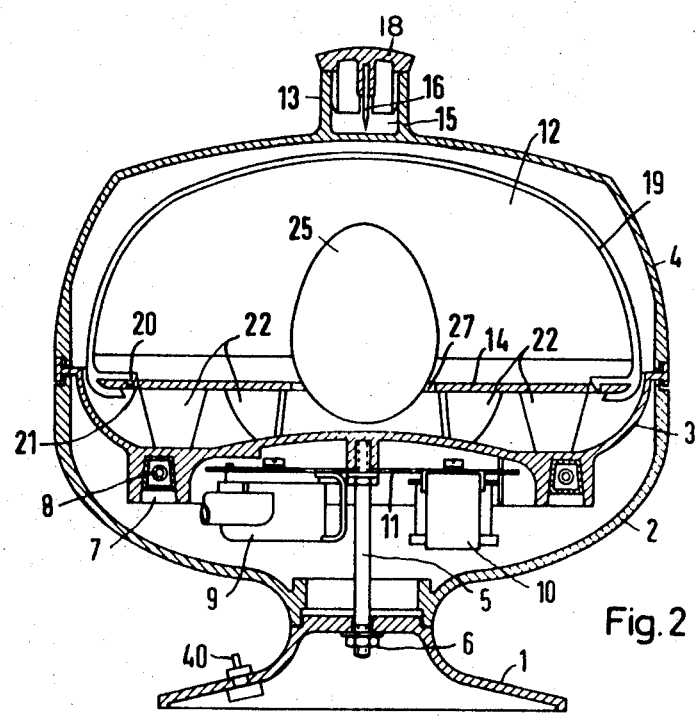
FIG. 2 is a longitudinal section of the egg cooker according to FIG. 1 equipped with a removable needle arranged on the cover portion of the cooker.

The egg cooker illustrated in FIGS. 1 and 2 has a chalice-like housing comprising a base 1 and a cup-shaped portion 2. As illustrated in FIG. 2, the cup-shaped portion 2 receives the water dish 3 and is closed from above by a removable cover 4.

An anchor bolt 5 is secured to the underside of the water dish 3 and extends centrally through the housing portion 1 and 2. By means of nut 6, housing portions 1 and 2 are tensioned against the lower face of the rim of the water dish 3 so that no further securing means is necessary.

The water dish 3 has a ring-shaped groove at its underside for receiving a tubular heating body 8. The electrical connection member 9, and monitor and signal members 10 are arranged on a carrier plate 11 which is secured to the anchor bolt 5. An electric switch 40 for energizing the heater body 8 is mounted in the base 1 of the chalice-like housing.

The grip 13 of cover 4 is constructed as an open, hollow extension of the latter which is closed by a removable cap 18. The cap 18 serves as a handle for a needle 16 which projects into the hollow portion 15 of the grip 13. When its use is required, the needle 16 is removed from the cover portion 4 with the aid of the handle or cap 18 and is used to pierce a small hole in the shell of each of the eggs to be cooked. The needle 16 and its cap 18 are prevented from falling out of the grip 13 by elastic tension of the cap 18 in the latter.

Figure 3:
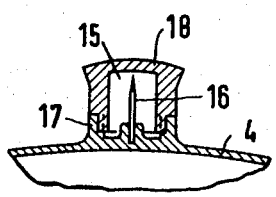
FIG. 3 is a fragmentary view of the cover of the egg cooker equipped illustrating a needle rigidly fixed to the cover.

In the embodiment according to FIG. 3, the needle 16 is rigidly secured in the cover 4 so as to project with its point over the grip portion 17 formed on the cover 4. A protective cap 18 which covers the needle 16 is screwed onto the grip portion 17 or is similarly removably secured, so that a grip is obtained which is similar to that illustrated in the embodiment of FIG. 2, which has a space 15 for receiving the needle 16.

As illustrated in FIG. 2, a disc-like egg carrier 14 is placed in the cooking space 12 closed by the removable cover 4. The carrier 14 has a lifting arm 19 which grips the latter at mutually opposite lying edge regions and is made of a poor heat conducting material with a small heat capacity.

The ends of the lifting arm 19 grip the egg carrier 14 in a claw-like manner with respective claw-like extensions arranged at the ends of the lifting arm. The claw-like extensions 20 grip into openings 21 in the egg carrier 14 so that a form-fit connection is obtained. At the underside of egg carrier 14 there are arranged feet 22 which rest upon the electrically heated water dish 3.

Figure 4:
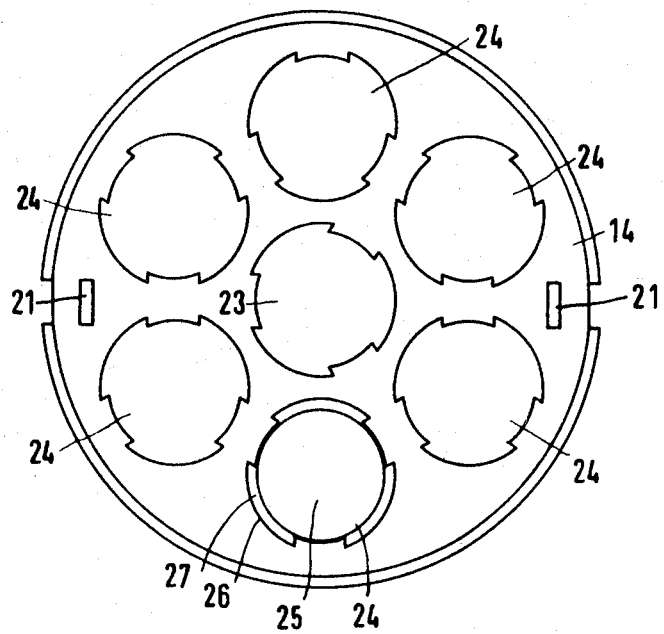
FIG. 4 is a plan view of an egg carrier with the carrier portion removed.

Referring to FIG. 4, the egg carrier 14 has a centrally located opening 23 and additional openings 24 surrounding the latter for receiving the eggs to be cooked. The openings 23, 24 are dimensioned so as to be non-circular. This permits the inserted egg to be held only at limited portions of the opening. In this way a space remains between the shells of the eggs 25 and the edge regions 26 through which steam developed in the water dish 3 can pass upwardly and directly along the shell of the eggs 25 and so that afterwards the condensate can run back into the dish 3.

Figure 5:
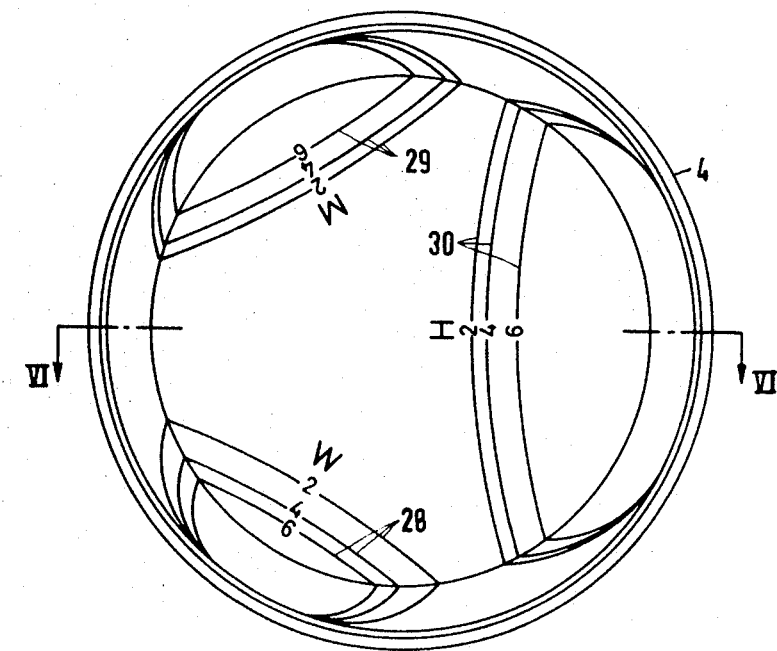
FIG. 5 is an inward view of the cover of the egg cooker.
Figure 6:
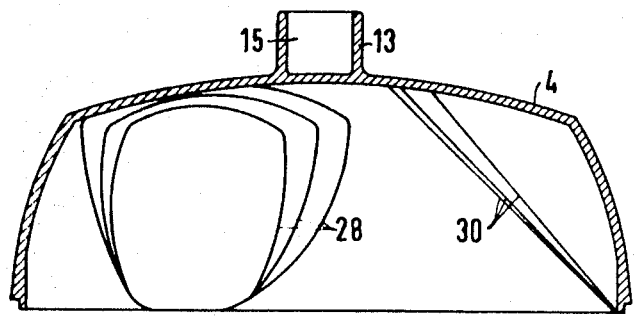
FIG. 6 is a section of the cover illustrated in FIG. 5 taken along the line VI—VI.

The cover 4 illustrated in FIGS. 5 and 6 can be made of transparent or light-penetrable material, for example from a suitable heat-resistant synthetic material. Various sets of curved bands 28, 29 and 30 are formed in cover 4 which provide respective indications of a definite quantity of water when the cover is held at an angle.

Since the current supplied to the heating body and therefore the heat developed are dependent upon the quantity of water filled into the cooking space, the quantity of water determined by means of the curves is decisive for the temperature of the eggs contained in cooking space. In this connection, attention must be given to the fact that the same degree of cooking for a larger number of eggs requires a smaller quantity of water.

Curved band groupings or sets 28, 29 and 30 therefore determine the degree of cooking corresponding to the designations W-M-H. These designations correspond respectively to soft, medium and hard wherewith the numbers 2, 4 and 6 associated with the respective curves correspond to the number of eggs.

For example, should four eggs be cooked soft, the cover 4 is first filled with water and the surplus spilled over the cover edge until the level of the water corresponds to curve 4 in the curved band set 28. This water quantity is then filled into the cooking space of the water dish of the cooker. Should it be desired to have only two eggs cooked soft, additional water must be filled into the cooking space corresponding to curve 2 of the curved bands 28 in order to maintain the same cooking time. In contrast, if it is desired to cook six eggs soft, then, a water quantity specified by curve 6 is required.

While the invention has been described by means of specific examples and in a specific embodiment, we do not wish to be limited thereto, for obvious modifications will occur to those skilled in the art without departing from the spirit and scope of the invention.

We claim:

1. Electric egg cooker for cooking eggs comprising a housing defining a cooking space in which the eggs are cooked, said housing being chalice-shaped, and comprising a base, a dish-shaped enclosure mounted on said base, a water dish disposed in said enclosure and having an under surface, a tubular heater body, groove means disposed in said surface for receiving said heater body, and removable anchor bolt means mutually connecting said water dish, said base and said enclosure.

2. An electric egg cooker according to claim 1, said anchor bolt means being a bolt secured in the bottom of said water dish.

3. An electric egg cooker according to claim 1 wherein said water dish and said dish-shaped enclosure define a hollow space, said cooker comprising a carrier plate disposed in said hollow space and secured to said bolt means, an electrical connection member, timing member and signal member, said members being disposed in said hollow space and mounted to said carrier plate.

4. Electric egg cooker for cooking eggs comprising a housing defining a cooking space in which the eggs are cooked, said housing being chalice-shaped, a cover lid for covering said housing, cavity means disposed on said lid defining a cavity, needle means for piercing the shell of the egg to be cooked, said needle means being disposed at least partially in said cavity, said needle means comprising a needle, and removable handle fixedly holding said needle, said handle being adapted to cover said cavity when said needle is disposed therein.

5. Electric egg cooker for cooking eggs comprising a housing defining a cooking space in which the eggs are cooked, said housing being chalice-shaped, a cover lid for covering said housing, cavity means disposed on said lid defining a cavity, needle means for piercing the shell of the egg to be cooked, said needle means being disposed at least partially in said cavity, said needle means comprising a needle fixedly mounted to said lid in said cavity, and removable cap for covering said cavity.

6. Electric egg cooker for cooking eggs comprising a housing defining a cooking space in which the eggs are cooked, said housing being chalice-shaped, an egg carrier placeable in said cooking space of said housing, said egg carrier having a lift arm, said lift arm having respective end portions which engage said egg carrier at mutually opposite locations on the rim thereof, said end portions of said lift arm being adapted so as to grip said carrier in a form-locking manner.

7. Electric egg cooker for cooking eggs comprising a housing defining a cooking space in which the eggs are cooked, said housing being chalice-shaped, a cover lid for covering said housing, said cover lid defining an enclosed space into which water for cooking is pourable for measuring quantities thereof, and index means disposed on the inner surface of said lid for measuring the quantity of water needed to cook a given number of eggs to given cooking degree, said index means being a group of spaced curves, each of said curves being an index for measuring the quantity of water needed to cook a given number of eggs to a given cooking degree, said curves each being tangent to the edge of said cover, whereby the required quantity of water is determined directly when the surplus water is spilled from said cover.

8. Electric egg cooker for cooking eggs comprising a housing defining a cooking space in which the eggs are cooked, said housing being chalice-shaped, a cover lid for covering said housing, said cover lid defining an enclosed space into which water for cooking is pourable for measuring quantities thereof, and index means disposed on the inner surface of said lid for measuring the quantity of water needed to cook a given number of eggs to given cooking degree, said index means being a plurality of groups of spaced curves, each one of said groups corresponding to a respectively different degree of cooking, the curves of each group corresponding to respective quantities of eggs to be cooked.

* * * * *